UNITED STATES PATENT OFFICE 2,285,420

VINYL RESIN PLASTIC COMPOSITION

Arthur K. Doolittle, South Charleston, W. Va., assignor to Carbide and Carbon Chemicals Corporation, a corporation of New York No Drawing. Application February 16, 1939,
Serial No. 256,727

9 Claims. (Cl. 260—36)

This invention concerns improved plastic compositions essentially composed of vinyl resins intimately associated with certain derivatives of ricinoleic acid, as well as the formation and uses of these compositions.

Like many other resins and resin-like materials, the vinyl resins may form the basis of various plastic compositions in which they are associated with other substances which modify their properties. For example, the vinyl resins may be compounded with various solvent-like substances of low volatility which act as plasticizers to form softened compositions of increased flexibility and resilience. In common with most related compositions, the plasticized vinyl resins generally become increasingly softer and the heat softening temperature of the composition is reduced as the amount of plasticizer in the composition is increased. Also, it is quite usual for these softened compositions to exhibit an increased tendency toward tackiness or stickiness as the quantity of plasticizer is increased, and this quality is almost invariably present when the plasticized compositions are additionally softened by heat.

A primary object of this invention is to provide plasticized vinyl resin compositions which are flexible and adequately softened by means of a high-boiling plasticizer, but which are further characterized by a minimum tendency to become tacky even when warmed to temperatures near those of the initial heat distortion point of the resins alone.

I have found by test that this object can be attained and that plastic compositions of marked value can be secured by the intimate association of vinyl resins with acylated ricinoleic acid esters of alkylene glycol and polyalkylene glycol monoaryl and monoalkyl ethers. The vinyl resins to which the invention is particularly applicable are those resulting from the conjoint polymerization of vinyl halides, such as vinyl chloride, with vinyl esters of the lower aliphatic acids, such as vinyl acetate, vinyl propionate and vinyl butyrate. Such vinyl resins as those formed when vinyl chloride is conjointly polymerized with vinyl acetate and which contain from about 60% to 95% of vinyl chloride in the polymer are especially valuable in the practice of the invention. The ricinoleic acid derivatives which are contemplated for use in the compositions of the invention include the acetyl ricinoleate of ethylene glycol monomethyl ether (beta-methoxyethyl acetyl ricinoleate), the acetyl ricinoleate of diethylene glycol monomethyl ether (beta-methoxyethoxyethyl acetyl ricinoleate), the acetyl ricinoleate of ethylene glycol monophenyl ether (beta-phenoxyethyl acetyl ricinoleate) and the acetyl ricinoleate of ethylene glycol monobutyl ether (beta-butoxyethyl acetyl ricinoleate). Other acylated ricinoleic acid esters of the various glycol monoethers can be used, and the entire class of substances of which the group of esters named is illustrative may be described by the general formula

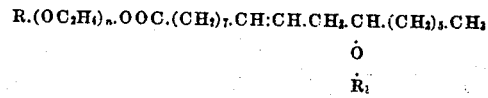

in which $n$ is a small whole number, R is an alkyl or aryl group, and $R_1$ is a monovalent acyl group. This formula designates a particular configuration for the ricinoleic acid radical, but it is to be understood that the terms "ricinoleate" and "ricinoleic acid" as used in this specification and the appended claims are intended to include such other configurations of this radical as may exist, and, specifically, those forms of the ricinoleic acid radical which exist in castor oil.

These esters can be made by a reaction involving an ester exchange between an alkylene or polyalkylene glycol monoaryl or monoalkyl ether and castor oil followed by isolation of the product and its acylation with an acid anhydride. The ester exchange reaction can be carried out easily by reacting the glycol monoether with castor oil in the presence of a catalyst composed of an alkali metal alcoholate which, conveniently, can be the glycol or polyglycol alkali metal monoether corresponding to that participating in the reaction. These esters and their formation by the method outlined are described and claimed in a copending application Serial No. 256,725 filed February 16, 1939, by T. F. Carruthers.

The plasticized compositions of this invention may comprise from about 5% to about 50% by weight of the ricinoleic acid derivatives of the class set forth together with about 50% to about 95% by weight of the vinyl resin. The particular proportions of the resin and plasticizer in any given composition will, of course, depend on the degree of softness which it is desired to have the composition possess, and these proportions will likewise be governed by the extent to which the particular resin and plasticizer are compatible, although the degree of compatibility of the materials may be of less importance in some compositions where complete homogeneity is not essential.

The compositions may be formed by mixing the ester and vinyl resin in various ways, and either mechanical or chemical aids or both can be employed to facilitate the forming operations. For example, the resin and ester can be mixed with mechanical manipulation on differential roll mills or in kneading machines which are heated to facilitate the operation. The degree of heating necessary in these operations may vary, but usually the ingredients mixed are heated to or somewhat above the softening point of the resin. Also, the materials can be compounded by dissolution in a mutual solvent which is then eliminated by evaporation or from which the plasticized composition can be precipitated by the action of a non-solvent.

The specific compositions appearing below will serve to illustrate the invention.

*Example 1*

A solution of 25 parts by weight of vinyl resin and 10 parts by weight of the acetyl ricinoleate of ethylene glycol monomethyl ether (beta-methoxyethyl acetyl ricinoleate) in 65 parts by weight of solvent vehicle was prepared. The vinyl resin used was the product of the conjoint polymerization of vinyl chloride with vinyl acetate containing 87% vinyl chloride in the polymer. The solvent vehicle was composed of 20 parts acetone, 30 parts methyl ethyl ketone and 50 parts hydrocarbons which were largely aromatic hydrocarbons of the toluene series.

This solution was used to coat silk cloth by passing the cloth through the solution and withdrawing it between pairs of rollers which removed the excess coating, followed by evaporation of the solvent. The coating deposited on the cloth was very flexible, and it additionally had the very desirable characteristic of freedom from tackiness even when warmed to 60° C., a temperature not greatly below the initial heat distortion temperature of the resin alone as determined by the A. S. T. M. method.

*Example 2*

A solution of 25 parts by weight of vinyl resin, 5 parts by weight of the acetyl ricinoleate of ethylene glycol monomethyl ether (beta-methoxyethyl acetyl ricinoleate) and 0.5 part by weight of dibutyl phthalate was prepared. The vinyl resin used was a mixture of equal parts of two resins, each of which was formed by the conjoint polymerization of vinyl chloride with vinyl acetate and contained about 87% by weight of vinyl chloride in the polymer, and one of which had an average macromolecular weight of about 8,000 to 10,000, while the other had an average macromolecular weight of about 5,000 to 7,000 (as estimated by Staudinger's method). The solvent used was a mixture of 34.75 parts by weight of methyl isobutyl ketone and 34.75 parts by weight of toluene.

Paper was coated with this composition applied by means of a coating machine, and the solvents were evaporated under mild heat. The coated paper was then very briefly baked at a high temperature.

The coated paper had a smooth and flexible coated surface, and the coating did not become tacky nor did stacks of the coated product show a tendency to "block" or adhere together at temperatures up to 65° C.

*Example 3*

Two compositions were prepared in which 100 parts by weight of the vinyl resin described in Example 1 were compounded with 2 parts by weight of lead stearate as a heat stabilizer and 25 parts by weight of plasticizer. In one of these compositions the plasticizer was di(ethylene glycol monobutyl ether) phthalate [di(beta-butoxyethyl) phthalate], a plasticizer widely used in vinyl resin compositions, while in the other the plasticizer used was the acetyl ricinoleate of ethylene glycol monomethyl ether (beta-methoxyethyl acetyl ricinoleate). Both compositions were obtained by mixing the ingredients on a heated differential 2-roll mill until a homogeneous composition was formed.

Samples of the composition embodying this invention were found by test to be considerably more flexible than those of the similar composition representing prior practice. Additionally, the composition made according to the present invention was found to undergo less change in its properties on change in temperature than was true of the composition containing the phthalate ester.

*Example 4*

A composition was formed of a vinyl resin as described in Example 1 in which 2 parts by weight of the resin were compounded with 1 part by weight of the acetyl ricinoleate of diethylene glycol monomethyl ether (beta-methoxyethoxyethyl acetyl ricinoleate). The plasticizer and resin were entirely compatible in these proportions, and the composition was clear and very flexible. Like the composition of Example 1, this plasticized composition was characterized by a minimum tendency to become tacky when warmed, and by a minimum change in its properties with changes in temperature.

The compositions just described are very valuable as flexible, resistant coatings on fibrous bases, such as paper, cloth and various fabrics. The flexibility of the coating in this use is largely preserved throughout a wide range of temperatures to which the composite material may be subjected, and coatings of these compositions are of particular value on paper and fabrics because of their lack of a tendency to become tacky at moderately elevated temperatures.

Compositions were also formed of vinyl resins and other acylated ricinoleic acid esters of the glycol monoethers. In every case, these compositions were of value where flexible plastic compositions are desired. In the case of the acetyl ricinoleates of ethylene glycol monobutyl and monophenyl ethers, the degree of compatibility with the resins was less than that of the two esters mentioned in the examples, but the exact amount of plasticizer which can or should be used is a matter easily determined by those familiar with this art. In all instances, however, the degree of compatibility of the vinyl resins with the esters used in the compositions of this invention was greater than that of the same vinyl resins with such closely related esters as the oleate of ethylene glycol monomethyl ether (beta-methoxyethyl oleate) or the acetyl ricinoleate of butyl alcohol (butyl acetyl ricinoleate), and compositions made with these latter esters do not have the desirable properties of those of the present invention.

Modifications in the improved plastic compositions are possible. Various methods of forming the compositions can be employed, and the proportions of vinyl resin and plasticizer can be widely varied. Mixtures of two or more of the plasticizers can frequently be present in a single composition with attendant advantages, and more than one type of vinyl resin also may be included. Other substances, such as solvents, pigments, fillers and the like, may be used in the compositions, and the compositions modified in these respects or otherwise are included within the invention as defined by the appended claims.

I claim:

1. A composition of matter essentially composed of a vinyl resin intimately associated with an acylated ricinoleic acid ester of one of the group consisting of alkylene and polyalkylene glycol monoaryl and monoalkyl ethers.

2. A composition of matter essentially composed of a vinyl resin intimately associated with an acetylated ricinoleic acid ester of one of the group consisting of alkylene and polyalkylene glycol monoaryl and monoalkyl ethers.

3. A composition of matter essentially composed of a vinyl resin substantially identical with a resin resulting from the conjoint polymerization of a vinyl halide with a vinyl ester of a lower aliphatic acid intimately associated with an acylated ricinoleic acid ester of one of the group consisting of alkylene and polyalkylene glycol monoaryl and monoalkyl ethers.

4. A composition of matter essentially composed of a vinyl resin substantially identical with a resin resulting from the conjoint polymerization of a vinyl halide with a vinyl ester of a lower aliphatic acid intimately associated with an acetylated ricinoleic acid ester of one of the group consisting of alkylene and polyalkylene glycol monoaryl and monoalkyl ethers.

5. A coating composition for fibrous materials essentially composed of a vinyl resin substantially identical with a resin resulting from the conjoint polymerization of vinyl chloride with vinyl acetate intimately associated with an acetyl ricinoleic acid ester of ethylene glycol monomethyl ether in an amount sufficient to render the composition flexible, said composition being characterized by a minimum tendency to become tacky when warmed and by a minimum change in properties on change of temperature.

6. A coating composition for fibrous materials essentially composed of a vinyl resin substantially identical with a resin resulting from the conjoint polymerization of vinyl chloride with vinyl acetate intimately associated with an acetyl ricinoleic acid ester of diethylene glycol monomethyl ether in an amount sufficient to render the composition flexible, said composition being characterized by a minimum tendency to become tacky when warmed and by a minimum change in properties on change of temperature.

7. Process for making flexible vinyl resin compositions characterized by minimum change in properties on change of temperature and by a minimum tendency to become tacky when warmed, which comprises intimately mixing a vinyl resin with an acylated ricinoleic acid ester of one of the group consisting of alkylene and polyalkylene glycol monoaryl and monoalkyl ethers until said resin and ester form a substantially homogeneous mass.

8. Process for making flexible vinyl resin compositions characterized by minimum change in properties on change of temperature and by a minimum tendency to become tacky when warmed, which comprises intimately mixing a vinyl resin with an acetylated ricinoleic acid ester of one of the group consisting of alkylene and polyalkylene glycol monoaryl and monoalkyl ethers, said mixing being carried out in the presence of a mutual solvent for said resin and ester.

9. Process for making flexible vinyl resin compositions characterized by minimum change in properties on change of temperature and by a minimum tendency to become tacky when warmed, which comprises intimately mixing a vinyl resin with an acetylated ricinoleic acid ester of one of the group consisting of alkylene and polyalkylene glycol monoaryl and monoalkyl ethers, until said resin and ester form a substantially homogeneous mass, said mixing being carried out by mechanically working said resin in the presence of said ester at temperatures above the softening point of said resin.

ARTHUR K. DOOLITTLE.